United States Patent
Masoudi et al.

(10) Patent No.: US 11,261,776 B2
(45) Date of Patent: Mar. 1, 2022

(54) METHODS AND DEVICES FOR CONTROLLING UREA MIXERS TO REDUCE NOX EMISSION FROM COMBUSTION ENGINES

(71) Applicant: EMISSOL LLC, Mill Creek, WA (US)

(72) Inventors: Mansour Masoudi, Mill Creek, WA (US); Edward B. Tegeler, IV, Shoreline, WA (US); Jacob R. Hensel, Bothel, WA (US)

(73) Assignee: EMISSOL LLC, Mill Creek, WA (US)

(*) Notice: Subject to any disclaimer, the term of this patent is extended or adjusted under 35 U.S.C. 154(b) by 0 days.

(21) Appl. No.: 17/043,587

(22) PCT Filed: Mar. 29, 2019

(86) PCT No.: PCT/US2019/024732
§ 371 (c)(1),
(2) Date: Sep. 29, 2020

(87) PCT Pub. No.: WO2019/191528
PCT Pub. Date: Oct. 3, 2019

(65) Prior Publication Data
US 2021/0025307 A1    Jan. 28, 2021

Related U.S. Application Data

(60) Provisional application No. 62/649,793, filed on Mar. 29, 2018.

(51) Int. Cl.
*F01N 3/20* (2006.01)
*F01N 3/28* (2006.01)

(52) U.S. Cl.
CPC ........... *F01N 3/208* (2013.01); *F01N 3/2892* (2013.01); *F01N 2240/16* (2013.01);
(Continued)

(58) Field of Classification Search
CPC combination set(s) only.
See application file for complete search history.

(56) References Cited

U.S. PATENT DOCUMENTS 10,058,819 B2    8/2018   Goffe
10,598,064 B2 *  3/2020   Everly ............... F23G 7/00
(Continued)

OTHER PUBLICATIONS

International Search Report and Written Opinion, PCT/US2019/024732, dated Jul. 25, 2019, 10 pgs.

*Primary Examiner* — Binh Q Tran
(74) *Attorney, Agent, or Firm* — Loza & Loza, LLP; Mark L. Cooper

(57) ABSTRACT

The present invention discloses methods and devices for controlling a heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the heated mixer, Methods include: determining a NOx reduction efficiency of the SCR catalyst; evaluating at least one reductant Uniformity Index (UI) based on operating parameters of the exhaust system and a mixer power calculation map; and modifying a mixer temperature of the heated mixer by regulating power to the heated mixer based on at least one reductant UI in order to improve at least one reductant UI and/or improve the NOx reduction efficiency. Alternatively, the method further includes: detecting at least one potential improvement of at least one UI and/or the NOx reduction efficiency based on an increased ammonia mass.

20 Claims, 6 Drawing Sheets

(52) U.S. Cl.
CPC ...... *F01N 2240/20* (2013.01); *F01N 2330/38* (2013.01); *F01N 2610/02* (2013.01); *F01N 2900/1404* (2013.01); *F01N 2900/1411* (2013.01); *F01N 2900/1621* (2013.01); *F01N 2900/1808* (2013.01); *F01N 2900/1821* (2013.01)

(56) References Cited

U.S. PATENT DOCUMENTS

| | | | |
|---|---|---|---|
| 10,934,918 B1* | 3/2021 | Goffe | B01D 53/9427 |
| 10,961,887 B2* | 3/2021 | Huang | F01N 3/2892 |
| 2009/0266061 A1* | 10/2009 | Takenaka | F01N 3/0814 60/295 |
| 2010/0024379 A1 | 2/2010 | Sengar et al. | |
| 2015/0059319 A1 | 3/2015 | Shiva et al. | |
| 2015/0241400 A1 | 8/2015 | Mitchell et al. | |
| 2015/0267596 A1* | 9/2015 | Tobben | F01N 13/08 60/274 |
| 2015/0315943 A1 | 11/2015 | Gschwind | |
| 2017/0234189 A1* | 8/2017 | Singh | F01N 3/2013 60/274 |
| 2018/0163590 A1 | 6/2018 | Park | |
| 2018/0371978 A1* | 12/2018 | Sampath | F01N 3/2066 |

\* cited by examiner

Exemplary Embodiment

Exemplary Embodiment

Exemplary Embodiment

Figure 6

| Parameter # | Name | Value | Value | Value | UI State | Uniformity Index (UI) |
|---|---|---|---|---|---|---|
| 1 | Engine-out NOx emission | Low | Mid | High | State 4 | UI 4 |
| 2 | Exhaust mass flow rate | Low | Mid | High | | UI 7 |
| 3 | Exhaust temperature | Low | Mid | High | | UI 6 |
| 4 | UWS injection rate, frequency, duty cycle | Low | Mid | High | | UI 10 |
| 5 | Exhaust Gas Recirculation (EGR) | Low | Mid | High | | UI 8 |
| 6 | Stored ammonia in catalyst | Low | Mid | High | State 3 | UI 3 |
| 7 | Mixer temperature | Low | Mid | High | State 2 | UI 2 |
| 8 | Other parameters | Low | Mid | High | | UI 11 |
| UI State | ///////////////// | UI State 1 | | UI State 9 | ///////// | //////////////// |
| UI | ///////////////// | UI 1 | UI 2 | UI 9 | ///////// | //////////////// |

METHODS AND DEVICES FOR CONTROLLING UREA MIXERS TO REDUCE NOX EMISSION FROM COMBUSTION ENGINES

FIELD AND BACKGROUND OF THE INVENTION

The present invention relates to methods and devices for controlling urea mixers to reduce NOx emission from combustion engines. In particular, the present invention relates to reduction and control of noxious gases, specifically nitrogen oxides ($NO_x$, commonly written as NOx), from internal combustion engines and especially in diesel engines (e.g., vehicles, marine vessels, stationary applications such as gensets, or in industrial plants for NOx emission control). More generally, the present invention may be used for control of other species and/or in other types of engines as well.

Diesel engines produce nitrogen oxides, or NOx, posing various risks to human respiratory and pulmonary systems. NOx is also associated with forming ground-level ozone, photochemical oxidants, acid rain, and fine particles (see below Literature citation 'SEI'), in addition to a variety of other detriments. Given such adverse impact, NOx emission is regulated at varying levels in the US, Europe, Japan, China and other regions (see below Literature citation 'ICCT-1').

Modern diesel vehicles in regions subject to emission regulations are equipped with emission control systems configured to reduce toxic NOx via ammonia in a catalyst known as Selective Catalytic Reduction (of NOx), commonly called SCR. Most diesel vehicles form ammonia, formed in situ by injecting urea-water solution (UWS) into hot exhaust pipes of such vehicles, some may inject gaseous ammonia. Referring to the drawings, FIG. 1 is a simplified high-level schematic diagram depicting a cross-sectional representation of elements in a portion of a combustion-engine exhaust system having a urea decomposition pipe, according to the prior art. An exhaust pipe 2 having a longitudinal flow of exhaust gas 4 is shown with an integrated urea spray injector 6 for spraying a urea-water solution (UWS) in order to inject UWS droplets 8 into exhaust gas 4. A mixer 10 is positioned downstream of injector 6 for mixing UWS droplets 8 with exhaust gas 4. UWS (typically a mixture of about 30-40% urea and with the balance being water) is also known as DEF (diesel exhaust fluid) and/or AdBlue.

In the process of mixing, the thermal energy of exhaust gas 4 is transferred to UWS droplets 8, raising the temperature of emerging UWS droplets 8. This, in turn, causes water to evaporate from UWS droplets 8, and urea to be converted into gaseous ammonia 12 (referred to hereinafter to be understood to also include isocyanic acid—an ammonia precursor). Some UWS droplets, especially larger ones, may not fully evaporate, and may enter the SCR catalyst where they too convert into ammonia in the catalyst's so-called hydrolysis length. In some systems, hydrolysis may take place in a stand-alone catalyst or unit upstream of the SCR catalyst. Reaction of ammonia 12 with noxious $NO_x$ species in a downstream SCR catalyst 14 converts the hazardous emissions into benign waste products of water and nitrogen ($N_2$).

The overall operation occurs satisfactorily at exhaust temperatures of about 200° C. or above, though higher temperatures of 250-350° C. are more desirable depending on the catalyst type and/or system configuration and needs.

Besides the complexities and inefficiencies of maintaining adequate temperatures of exhaust gas 4 in order to ultimately convert UWS droplets 8 into ammonia 12 via evaporation through well-known thermolysis and hydrolysis reactions (see below Literature citation 'Nova'), UWS droplets 8 can also collect as liquid pools 16 on the relatively colder inner surfaces of exhaust pipe 2. Such liquid pools 16 then lead to urea crystallizing to form solid deposits in low-temperature operation, typically about or below about 200° C. Likewise, urea crystals may also form on the mixer, injector tip, the catalyst, or on other components or attachments nearby.

A urea "decomposition pipe length" 18 represents the section of exhaust pipe 2 in which conversion of UWS droplets 8 into ammonia 12 is required to occur. In many systems, decomposition pipe length 18 includes a curved section of varying form in order to accommodate geometric spacing constraints and various other system limitations. In FIG. 1, such a curved section is depicted as SCR inlet cone 20 leading into SCR catalyst 14. In some other configurations, the mixer may be positioned differently, for instance inside a relatively large space (like a box) along with the catalyst itself, or in other possible variations (see below Literature citation 'CLEERS-2018-1' for examples of different variations). Such curved sections or likewise tight spacing can have dramatic effects on droplet properties such as in distribution uniformity of UWS droplets 8 and/or in distribution uniformity of the subsequently-formed ammonia 12 in the gas stream of exhaust gas 4.

Distribution uniformity of reductants is significant in the downstream sections of decomposition pipe length 18 or SCR inlet cone 20 as the reductants (ammonia and/or unevaporated droplets) are about to enter SCR catalyst 14 for NOx reduction reactions. Uniform distribution of reductants increases NOx catalytic efficiency; poor, non-uniform (uneven) distribution reduces catalytic efficiency.

The formation of sufficient ammonia, a strongly temperature-dependent process, is critical for proper NOx reduction in the SCR catalyst under all operating conditions. SCR has been also proposed for NOx reduction in lean gasoline engines (see below Literature citation 'CLEERS-2018-2').

While preferred operating exhaust temperatures are above about 200° C., there are situations in which the exhaust temperature could be below about 200° C. Examples of such operating conditions include: vehicle operating under low-load conditions, vehicle operating in city driving conditions (i.e., stop-and-go traffic behavior), vehicle operating for local-delivery use, and/or vehicles in idling operation. Under most of these conditions, engines produce low-temperature exhaust gas, sometimes even as low as about 100° C. Consequently, an injected UWS spray cannot form sufficient ammonia needed for NOx reduction in an SCR catalyst; instead, the spray droplet may form undesirable urea crystals as in liquid pools 16, hindering NOx reduction while also potentially damaging the exhaust components.

For these reasons, NOx reduction in modern diesel vehicles is largely unachieved under such low exhaust-temperature conditions, consequently subjecting individuals, communities, and the environment to marked NOx toxicity.

Recent findings continue to emphasize that NOx emission from low-temperature exhaust operating conditions remain a major challenge to the automotive industry (see below Literature citations 'Analytics' and 'Science'). Furthermore, higher NOx concentrations require larger amounts of UWS in the exhaust gas stream, which in turn require more thermal energy to form the requisite ammonia concentration. Forming ammonia from the injected UWS is particularly challenging at lower exhaust temperatures in which sufficient exhaust heat is not available.

In the art, Watlow Electric Manufacturing Co. presented at the 2017 10th Integer Emissions Summit on the topic of the development of robust exhaust heating systems for medium duty diesel vehicles. Watlow Co. also published in 2017 an Installation & Maintenance Manual for ECO-HEAT Heaters related to exhaust heaters.

Other publications by Watlow Co. include SAE 2018-01-1428 at the 2018 SAE Congress on exhaust heating system performance for boosting SCR low temperature efficiency.

US Patent publication No. 2011/0023461 by Strots et al. discloses an exhaust aftertreatment system with a heated device. Continental Emitec GmbH and Umicore AG & Co KG presented at the 2017 38th International Vienna Motor Symposium on the topic of the way to achieve "CARB post 2023" emission legislation for commercial vehicles.

It would be desirable to have methods and devices for controlling urea mixers to reduce NOx emission from combustion engines. Such methods and devices would, inter alia, overcome the various limitations mentioned above.

SUMMARY

It is the purpose of the present invention to provide methods and devices for controlling urea mixers to reduce NOx emission from combustion engines.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

The terms "information," "signal," "input," "algorithm," and "data" may be used interchangeably or synonymously throughout the description. Furthermore, the terms "urea water solution," "UWS," "ammonia," and "reductant" may be used interchangeably or synonymously throughout the description.

Embodiments of the present invention provide controllers to manage and energize a urea mixer for accelerated formation of reductants in low-temperature environments. Using input signals from the engine and emission control components or system, such controllers can energize urea mixers to raise the temperature of injected droplets in order to accelerate the formation of reductants (i.e., gaseous ammonia and isocyanic acid) for NOx reduction (purification) in a downstream catalyst. Such capabilities are particularly useful under operating conditions of lower exhaust temperatures in which ammonia formation is challenging, risky, and problematic.

Since UWS injection at low exhaust temperatures (e.g., below about 200° C.) involves challenges, it is advantageous to subject the injected UWS droplets to excess heating. UWS mixers (often referred to as urea mixers or simply as mixers) are commonly used to distribute injected UWS spray droplets into the exhaust flow. Mixers may be further coated with a hydrolysis composition or accompanied by a hydrolysis unit downstream of the mixer, to accelerate the formation of reductants. Amongst various methods to heat the injected UWS spray, one technique utilizes a heated mixer. The mixer may be heated using one or more energy type such as electrical, microwave, mechanical, radiative, magnetic, inductive, heated fluid circuit or such using an electric heating component, a piezoelectric heating module, a magnetic field-generated/induction coil heating component, a radiant-type heating component, a heat-exchange heating component or a mechanical heating component.

Consequently, when the injected UWS droplets impinge upon such a heated mixer, the droplet temperature increases, resulting in faster rate of thermolysis and hydrolysis, and in turn a faster formation and higher concentration of reductants.

Such a heated mixer requires a controller to adapt the operation of the heated mixer to the dynamically changing conditions of the engine system and its environment. Such controllers according to embodiments of the present invention can control the quantity, rate, and manner in which energy is delivered to heat the mixer, with an ultimate goal of heating the UWS droplets impinging on the mixer to accelerate reductant formation and to avoid urea crystallization. Such controllers make determinations and assessments based on system sensor data and on-board logic to decide, inter alia, when, how, and at what rate to energize the heated mixer in order to raise the mixer temperature, as well as control other parameters by sending signals to other system components for proper system or sub-system performance coordination or optimization.

Therefore, according to the present invention, there is provided for the first time a method for controlling a heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the heated mixer, the method including the steps of: (a) determining a NOx reduction efficiency of the SCR catalyst; (b) evaluating at least one reductant Uniformity Index (UI) based on operating parameters of the exhaust system and a mixer power calculation map; and (c) modifying a mixer temperature of the heated mixer by regulating power to the heated mixer based on at least one reductant UI in order to improve at least one reductant UI and/or improve the NOx reduction efficiency.

Alternatively, the operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer temperature, a stored ammonia mass in the SCR catalyst, a stored NOx mass in the SCR catalyst, a stored sulfur mass in the SCR catalyst, a stored hydrocarbon mass in the SCR catalyst, an Exhaust Gas Recirculation (EGR) percentile setting, an engine load, and an engine speed.

Alternatively, a plurality of the reductant UIs forms a basis for at least one UI state, and wherein at least one UI state is indicative of a relative NOx reduction efficiency.

Alternatively, at least one reductant UI is evaluated for at least one specific location in the exhaust system, and wherein at least one specific location includes a catalyst location upstream of the SCR catalyst and/or a mixer location upstream of the heated mixer.

Alternatively, the step of modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

Alternatively, the method further includes the step of: (d) validating at least one reductant UI and/or the mixer power calculation map based on the operating parameters of the exhaust system.

Alternatively, the method further includes the step of: (d) detecting at least one potential improvement of at least one UI and/or the NOx reduction efficiency based on an increased ammonia mass in the exhaust system.

Alternatively, the method further includes the step of: (d) prior to the step of determining, removing urea crystal deposits by regulating power to the heated mixer prior to any UWS injection in the exhaust system.

Alternatively, the method further includes the step of: (d) prior to the step of determining, priming the heated mixer by instructing the UWS injector to inject UWS onto the heated mixer.

Alternatively, the method further includes the steps of: (d) prior to the step of determining, increasing power to the heated mixer prior to any UWS injection in the exhaust system; (e) prior to the step of determining, measuring an increased ammonia mass in the exhaust system; and (f) prior to the step of determining, identifying a urea crystal blockage of the exhaust system based on: (i) observing a higher exhaust gas pressure than under normal operating conditions of the exhaust system; and (ii) the increased ammonia mass in the exhaust system.

According to the present invention, there is provided for the first time a device for controlling a heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the heated mixer, the device including: (a) a CPU for performing computational operations; (b) a memory module for storing data; (c) a controller module configured for: (i) determining a NOx reduction efficiency of the SCR catalyst; (ii) evaluating at least one reductant Uniformity Index (UI) based on operating parameters of the exhaust system and a mixer power calculation map; and (iii) modifying a mixer temperature of the heated mixer by regulating power to the heated mixer based on at least one reductant UI in order to improve at least one reductant UI and/or improve the NOx reduction efficiency.

Alternatively, the operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer temperature, a stored ammonia mass in the SCR catalyst, a stored NOx mass in the SCR catalyst, a stored sulfur mass in the SCR catalyst, a stored hydrocarbon mass in the SCR catalyst, an Exhaust Gas Recirculation (EGR) percentile setting, an engine load, and an engine speed.

Alternatively, a plurality of the reductant UIs forms a basis for at least one UI state, and wherein at least one UI state is indicative of a relative NOx reduction efficiency.

Alternatively, at least one reductant UI is evaluated for at least one specific location in the exhaust system, and wherein at least one specific location includes a catalyst location upstream of the SCR catalyst and/or a mixer location upstream of the heated mixer.

Alternatively, the modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

Alternatively, the controller module further is configured for: (iv) validating at least one reductant UI and/or the mixer power calculation map based on the operating parameters of the exhaust system.

Alternatively, the controller module further is configured for: (iv) detecting at least one potential improvement of at least one UI and/or the NOx reduction efficiency based on an increased ammonia mass in the exhaust system.

Alternatively, the controller module further is configured for: (iv) prior to the determining, removing urea crystal deposits by regulating power to the heated mixer prior to any UWS injection in the exhaust system.

Alternatively, the controller module further is configured for: (iv) prior to the determining, priming the heated mixer by instructing the UWS injector to inject UWS onto the heated mixer.

Alternatively, the controller module further is configured for: (iv) prior to the determining, increasing power to the heated mixer prior to any UWS injection in the exhaust system; (v) prior to the determining, measuring an increased ammonia mass in the exhaust system; and (vi) prior to the determining, identifying a urea crystal blockage of the exhaust system based on: (A) observing a higher exhaust gas pressure than under normal operating conditions of the exhaust system; and (B) the increased ammonia mass in the exhaust system.

According to the present invention, there is provided for the first time a non-transitory computer-readable storage medium, having computer-readable code embodied on the non-transitory computer-readable storage medium, for controlling a heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the heated mixer, the computer-readable code including: (a) program code for determining a NOx reduction efficiency of the SCR catalyst; (b) program code for evaluating at least one reductant Uniformity Index (UI) based on operating parameters of the exhaust system and a mixer power calculation map; and (c) program code for modifying a mixer temperature of the heated mixer by regulating power to the heated mixer based on at least one reductant UI in order to improve at least one reductant UI and/or improve the NOx reduction efficiency.

Alternatively, the operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer temperature, a stored ammonia mass in the SCR catalyst, a stored NOx mass in the SCR catalyst, a stored sulfur mass in the SCR catalyst, a stored hydrocarbon mass in the SCR catalyst, an Exhaust Gas Recirculation (EGR) percentile setting, an engine load, and an engine speed.

Alternatively, a plurality of the reductant UIs forms a basis for at least one UI state, and wherein at least one UI state is indicative of a relative NOx reduction efficiency.

Alternatively, at least one reductant UI is evaluated for at least one specific location in the exhaust system, and wherein at least one specific location includes a catalyst location upstream of the SCR catalyst and/or a mixer location upstream of the heated mixer.

Alternatively, the modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

Alternatively, the computer-readable code further includes: (d) program code for validating at least one reductant UI and/or the mixer power calculation map based on the operating parameters of the exhaust system.

Alternatively, the computer-readable code further includes: (d) program code for detecting at least one potential improvement of at least one UI and/or the $NO_x$ reduction efficiency based on an increased ammonia mass in the exhaust system.

Alternatively, the computer-readable code further includes: (d) program code for, prior to the determining, removing urea crystal deposits by regulating power to the heated mixer prior to any UWS injection in the exhaust system.

Alternatively, the computer-readable code further includes: (d) program code for, prior to the determining, priming the heated mixer by instructing the UWS injector to inject UWS onto the heated mixer.

Alternatively, the computer-readable code further includes: (d) program code for, prior to the determining, increasing power to the heated mixer prior to any UWS injection in the exhaust system; (e) program code for, prior to the determining, measuring an increased ammonia mass in the exhaust system; and (f) program code for, prior to the determining, identifying a urea crystal blockage of the exhaust system based on: (i) observing a higher exhaust gas pressure than under normal operating conditions of the exhaust system; and (ii) the increased ammonia mass in the exhaust system.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 6 is a table showing a parametric matrix of exhaust system parameters for different combinations of UI states corresponding to reductant uniformity indices wherein exemplary UI states are arbitrarily shown by the various matrix path arrows.

DESCRIPTION OF THE ILLUSTRATIVE EMBODIMENTS

The present invention relates methods and devices for controlling urea mixers to reduce NOx emission from combustion engines. The principles and operation for providing such methods and devices, according to the present invention, may be better understood with reference to the accompanying description and the drawings.

Figure 1:
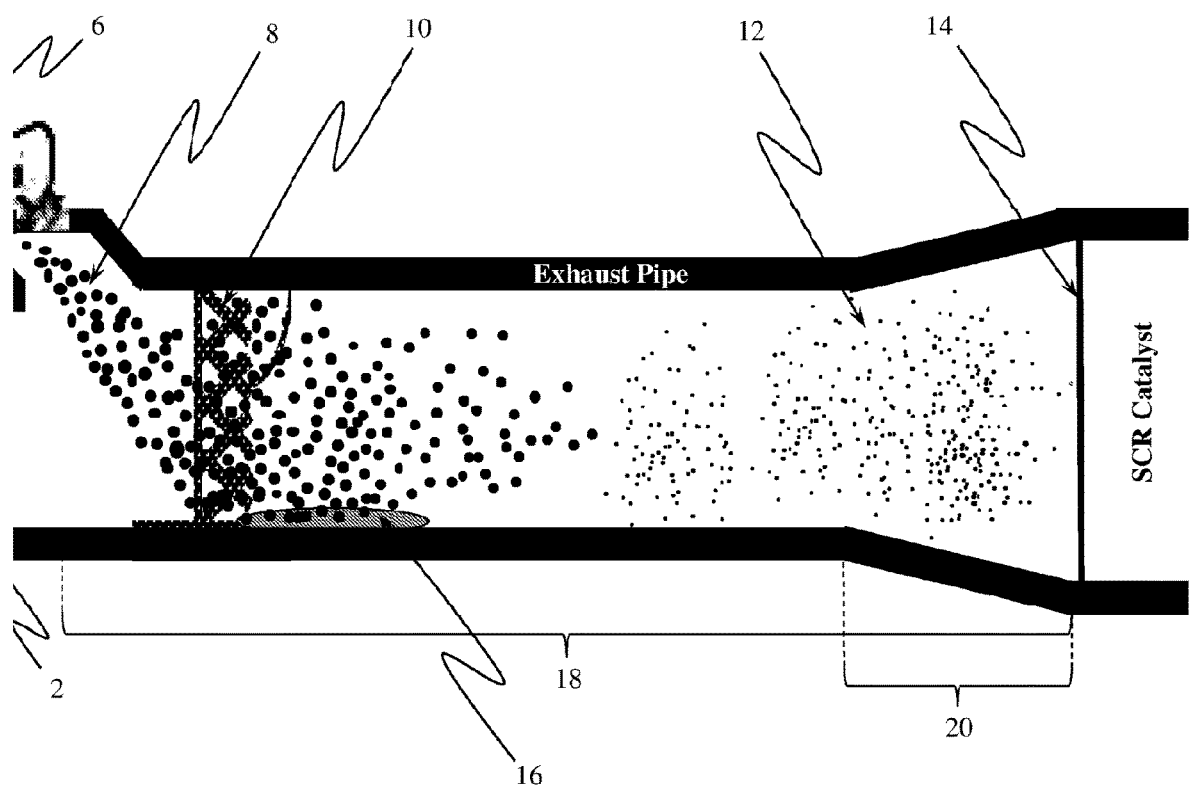
FIG. 1 is a simplified high-level schematic diagram depicting a cross-sectional representation of elements in a portion of a combustion-engine exhaust system having a urea decomposition pipe, according to the prior art.
Figure 2:
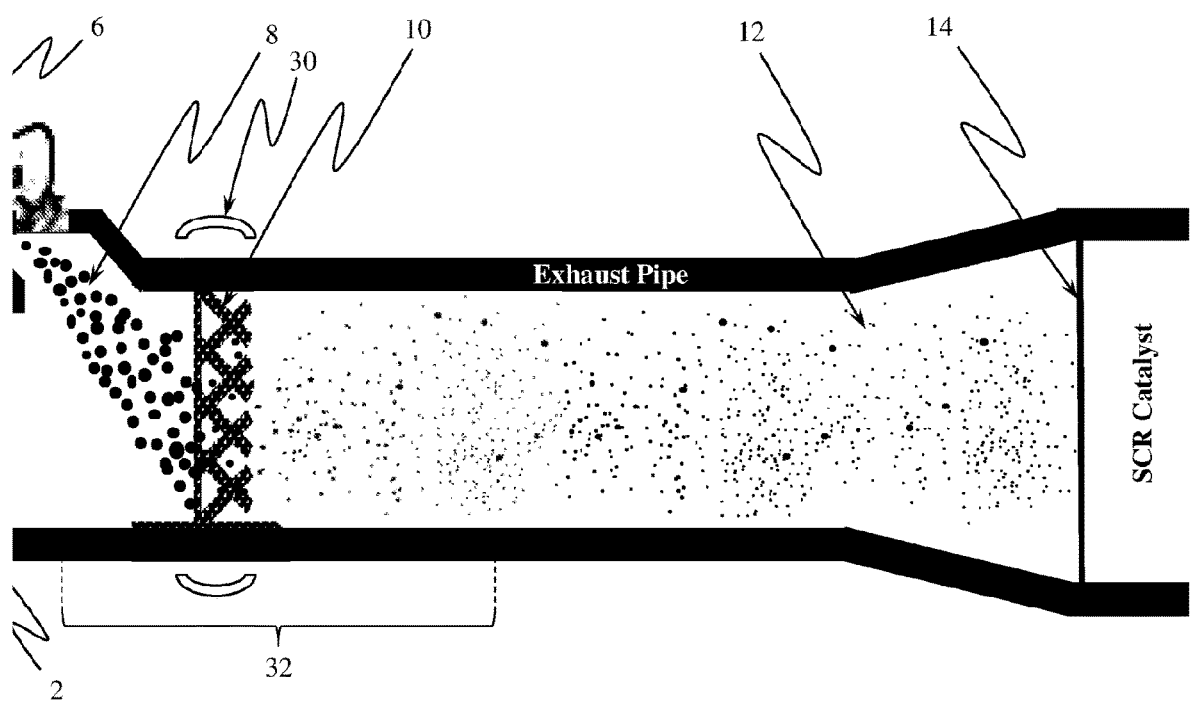
FIG. 2 is a simplified high-level schematic diagram depicting a cross-sectional representation of elements in a portion of a combustion-engine exhaust system having a heated mixer to enhance system performance, according to embodiments of the present invention.

Referring again to the drawings, FIG. 2 is a simplified high-level schematic diagram depicting a cross-sectional representation of elements in a portion of a combustion-engine exhaust system having a heated mixer to enhance system performance, according to embodiments of the present invention. The configuration of FIG. 2 can be used to produce an effectively-reduced urea decomposition zone, increase gaseous reductant concentration, and/or increase uniformity quality relative to the configuration of FIG. 1. Added to the exhaust system of FIG. 1 are heating components 30 configured to heat a mixer 10 in order to elevate the temperature of UWS droplets 8 directly to be rapidly converted into gaseous ammonia 16 (or its precursor), which may take place in mixer 10 and/or downstream of mixer 10.

In so doing, while urea decomposition pipe length 18 of FIG. 1 remains the same, the conversion of urea into ammonia/ammonia precursor is regulated over an effectively-reduced urea decomposition zone 32, reducing also complexity and risks of forming urea deposits, component failure or inefficient SCR of NOR. Furthermore, with urea decomposition zone 32 effectively reduced by inclusion of heating components 30, urea decomposition pipe length 18 of FIG. 1 can be reduced by moving SCR catalyst 14 closer to mixer 10, resulting in a more compact system. Mixer 10 and heating components 30 of various types can be configured and employed as described above in the Summary section in order to provide configuration and performance flexibility, and to further suit the needs and constraints of the operating system.

Figure 3:
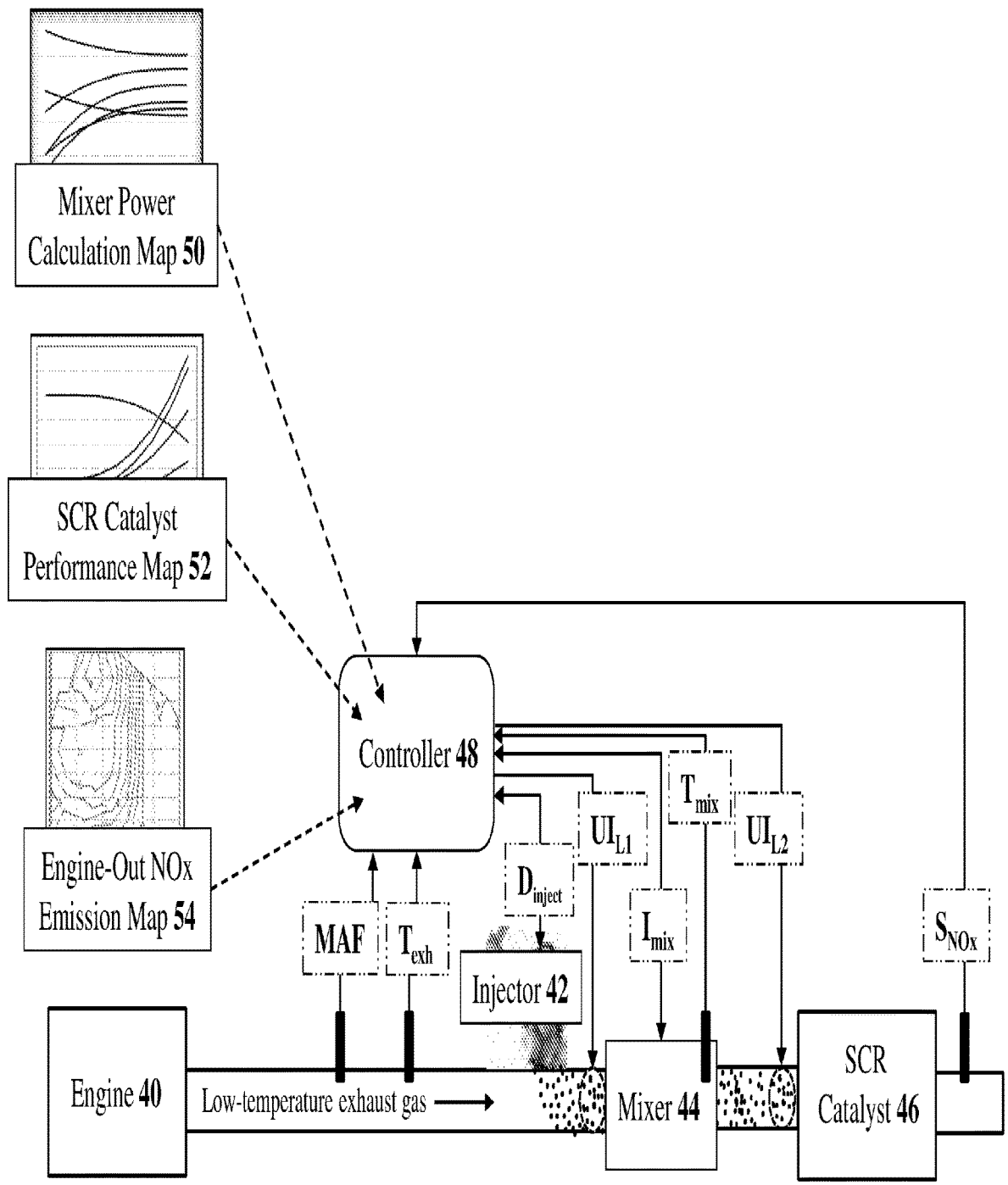
FIG. 3 is a simplified high-level schematic diagram depicting the system architecture of a mixer controller operationally connected to a general representation of the combustion-engine exhaust system of FIG. 2, according to embodiments of the present invention.

FIG. 3 is a simplified high-level schematic diagram depicting the system architecture of a mixer controller operationally connected to a general representation of the combustion-engine exhaust system of FIG. 2, according to embodiments of the present invention. The combustion-engine exhaust is represented by an engine 40 with its exhaust pipe emitting low-temperature exhaust gas. An injector 42 is shown injecting a UWS spray upstream of a heated mixer 44. The gas stream continues into an SCR catalyst 46 before exiting the system. Sensors in the exhaust system are provided to obtain information from the gas stream including: an exhaust temperature signal ($T_{exh}$), a mass air-flow signal (MAF), injection data ($D_{inject}$) providing UWS spray injection information (e.g., droplet size based on injector pump pressure, injected mass, and frequency, and duty cycle), an mixer temperature signal ($T_{mix}$), and a $NO_x$ signal ($S_{NOx}$) for measuring NOx concentration downstream of SCR catalyst 46.

A controller 48 is shown including onboard logic relating to a mixer power calculation map 50 and an SCR catalyst performance map 52 (e.g., of ammonia storage, NOx storage, and reduction, potentially partly provided by a UWS injector controller, not shown) of SCR catalyst 46. Controller 48 may optionally incorporate into its on-board logic an engine-out NOx emission map 54 obtained as input, for instance, from the engine's Electronic Control Unit (ECU), from another map, or from a direct, upstream NOx sensor signal (not shown). Alternatively, additional sensors may supply further engine status data to controller 48 such as other ECUs, emission control systems, or sub-components therein. Regardless of their sources, such signals may include, but are not be limited to:

NOx information such as engine-out NOx emission map 54 providing NOx concentration, pre- and/or post-SCR NOx concentration information (e.g., via signal(s) from pre- or post-SCR NOx sensor(s) such as $S_{NOx}$, from onboard, model-based algorithm(s) tracking NOx concentration or from a combination thereof;

Exhaust temperature information such as $T_{exh}$;

Exhaust flow rate information such as MAF;

UWS injection information ($D_{inject}$) such as one or combination of injected UWS mass or rate, droplet size, temperature, injection mass, spray cone angle, spray distribution, injection frequency/duty cycle, and/or in combination with other UWS information that may be received from the UWS injector's dosing controller (often called a Dosing Control Unit or DCU);

Uniformity index (UI, detailed below) of reductant distribution (reductant may collectively refer to any combination of ammonia, isocyanic acid, and/or unevaporated reductant droplets which mostly convert to ammonia once they enter the catalyst) post-mixer, and/or at the SCR catalyst entrance, for example, as in UI locations $UI_{L1}$ (i.e., spray/exhaust gas distribution information/uniformity at mixer entrance) and $UI_{L2}$ (i.e., reductant/exhaust gas distribution information/uniformity at catalyst entrance) shown in FIG. 3;

Uniformity index of exhaust gas flow/velocity at a desirable cross-section and/or at the SCR catalyst entrance such as at $UI_{L1}$ and $UI_{L2}$;

SCR catalyst information such as SCR catalyst performance map 52 used in calibration and operation of SCR catalyst 46 such as the catalyst's ammonia and NOx storage (e.g., as a function of catalyst temperature or other parameters thereof), catalyst aging and adaptation calibration maps, sulfur/hydrocarbon impact map, and/or similar information;

Temperature of mixer 44 as, for instance, may be sensed via a model, via a temperature sensor positioned on the mixer such as $T_{mix}$, or in the exhaust gas at a suitable position;

Ammonia concentration information from model-based algorithms or from ammonia sensor(s) available in some emission control systems (not shown in FIG. 3);

Heat loss/gain from mixer 44 before and/or after energizing mixer 44 to/from the exhaust flow, for example, from a model embedded in mixer power calculation map 50;

Engine's Exhaust Gas Recirculation (EGR) information or its impact, where applicable, on engine-out NOx;

Efficiency response of mixer 44 (i.e., power efficiency losses); and/or

Other parameters of relevance warranted by one skilled in the art.

Mixer controller 48, utilizing onboard logic/algorithms (detailed below), is configured to use any combination of input parameters noted above to calculate the power (e.g., wattage) needed to heat (i.e., energize) mixer 44 via a mixer input signal ($I_{mix}$) in order to provide the necessary heat transfer to the urea droplets of the UWS spray. Controller 48 is configured to energize mixer 44 accordingly to increase the UWS droplet temperature upon droplet contact with mixer 44, and hence to increase reductant formation as needed for adequate catalyst performance downstream.

Controller 48 may energize mixer 44 for various reasons. For instance, mixer 44 may be energized to increase the droplet temperature upon their impingement with mixer 44. Alternatively, since exhaust temperature would change due to heated mixer 44 locally reducing exhaust gas density, controller 48 may heat mixer 44 to induce local gas density variations for impacting flow uniformity and/or flow stratification for example.

Mixer power calculation map 50 embedded in controller 48 is capable of calculating a reductant Uniformity Index (UI, sometimes referred to herein as uniformity for simplicity) using system parameters as elaborated on below. If system NOx reduction efficiency is underperforming, controller 48 may increase $T_{mix}$ to provide increased reductant, or to improve in uniformity to further increase NOx reduction efficiency in SCR catalyst 46 downstream. It is noted that $T_{mix}$ can be fed back into controller 48 by measuring the potential difference across mixer 44.

In general, most of the signals noted above, or additional ones not noted as may be warranted by one skilled in the art, are received by controller 48 and processed for its proper operation of mixer 44. However, there are circumstances in which controller 48 may, in return, issue feedback signals to one or more components noted above or additional ones not noted, coordinating/managing component operation along with the primary functions of controller 48, mixer 44, or SCR catalyst 46. In such circumstances, controller 48 would not be just receiving and processing information for its own purpose, but would also be sending information to components for improved system or sub-system performance.

An example of such ancillary control by controller 48 is urea injection. While urea injectors generally have their own controllers, and are configured to operate mostly independently using certain algorithms to meet NOx reduction system needs, controller 48 may not only receive signal information from the urea injector controller (e.g., injection mass, frequency, or duty cycle), but may also send signals/information back to urea injector 42, correlating mixer controller performance with injector controller's calculations of injection mass or other operating parameters.

Another example of such ancillary control by controller 48 is sending and/or receiving signal/information to/from the EGR. Such examples may be easily expanded to other feedback scenarios from/to other components.

There are various ways for controller 48 to continuously assess dynamic changes impacting system performance; such changes could impact the controller's decision-making and/or sent/received signals to/from mixer 44. Controller 48 can be configured to monitor dynamic changes by monitoring any received and/or processed signals such as changes in:

any NOx concentration signals from hardware, software, and/or a model-based algorithm, exhaust temperature or flow, UWS injected mass, rate, frequency, and/or duty cycle;

injection quality such as due to partial blocking of the injector's hole with urea crystals or exhaust soot or due to injector aging;

injector environment adaptation referred to as injector DCU adaptation strategies or measures;

uniformity indices of flow or reductant;

catalyst performance (e.g., NOx reduction efficiency, stored NOx or ammonia, catalyst aging, and sulfur/hydrocarbon impact);

mixer temperature such as due to excess cooling by the exhaust flow or due to unlikely formation of urea crystal deposits on the mixer;

ammonia concentration in the exhaust flow and/or as stored in the catalyst (with or without an ammonia sensor implemented); and/or efficiency response of the mixer.

One should note that controller 48 may become aware of any of these changes via hardware signals, software signals, embedded maps, and/or via model-based algorithms.

With controller 48 assessing any combination of dynamic changes, mixer power calculation map 50 is configured to "correct" or update $I_{mix}$ to mixer 44 for improved mixer performance, and thus enhanced reductant formation quality and quantity, resulting in augmented NOx reduction catalyst performance.

One parameter key to such improvements, warranted by dynamic changes, is reductant uniformity. It is fair to say that while forming proper reductant concentration is key to catalyst performance, so is reductant distribution quality commonly called uniformity or uniformity index. This is because uniform distribution of the reductant at the entrance of SCR catalyst 46 is critical for proper catalyst operation. UI can be determined based on various UI expressions.

Figure 4A:
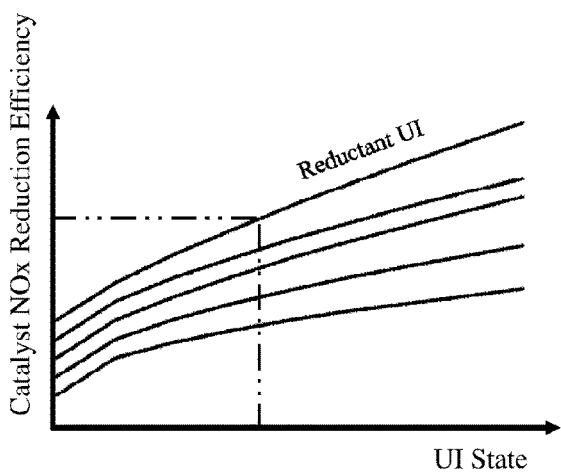
FIG. 4A depicts a graph of the collective exemplary UI states shown in Table 1, according to embodiments of the present invention.

To predict various performance conditions (called UI states), a parametric correlation matrix can be constructed as depicted in Table 1. Each UI state has its own reductant uniformity index. A judicious selection of performance parameters enables predictive capabilities for all applicable UI states pertaining to various performance conditions. FIG. 4A depicts a graph of the collective exemplary UI states, resulting from a parametric matrix study exemplified in Table 1, to form a predictive map of reductant UIs, according to embodiments of the present invention. The mapping of collective UI states allows predictive capability of reductant UIs under various operating conditions.

In order to construct such a predictive map as in FIG. 4A, UIs must be derived for all states in the matrix of Table 1, in practical combinations of several low, mid, or high values (acknowledging that it is understood that low, mid, or high values can correspond to a range of values). For instance, for a 15-liter diesel engine, one may consider parameters of operating conditions captured in a matrix such as in Table 1, given as combinations of low/high exhaust mass flow rate (e.g., about 300-1,500 kg/hr), low/high flow temperature (e.g., about 120-400° C.), low/high UWS injection rate (e.g., about 1-100 g/min.), EGR setting (e.g., about 10-35%), and engine-out NOx emission (e.g., about 1-4 g/bhp-hr). Other values of interest can also be included such as mass of stored ammonia in the SCR catalyst (e.g., about 0.1-10 g). In the event, a heated mixer is used, mixer temperature (e.g., about 100-400° C.) can be included.

Another parameter of interest is catalytic efficiency of NOx reduction catalyst, typically low at lower temperatures and high in higher temperatures (e.g., about 30-99%), while depending on other parameters as well. One should note such ranges are directional, inexact, and vary widely among different engines, depending inter alia on engine displacement volume, calibration, application, duty cycle, and performance environment. Similarly, parameters may be limited to a few, or conversely expanded above and beyond those listed here, depending on the desired level of performance fidelity.

Different approaches may be taken to derive corresponding UI for each state: experimental setups, computer simulations, mathematical modeling, or a combination thereof. It is often paramount to take into account "system hardware" geometry (e.g., exhaust pipe size, shape, and mixer geometry), flow rate/temperature combinations, UWS injection conditions (e.g., rate and droplet size), and/or other parameters of interest. Experimental approaches to measure each UI state may include using a cross-flow porous membrane and spray visualization to determine distribution uniformity as described in US Patent Publication No. 2016/0239954A1 (assigned to the same entity as the present invention), or by positioning a gas analyzer repeatedly at several points in a given flow cross-section of interest to measure pointwise reductant concentrations, from which the UI state could be readily calculated.

An exemplary expression for UI is provided (see below Literature citation 'Weltens') in the form of:

$$\gamma = 1 - \frac{\sum \sqrt{(\omega_i - \overline{\omega})^2}}{2n\overline{\omega}},$$

commonly used in configuring emission control systems (see below Literature citation 'Munnannur'), may be used to calculate the reductant UI shown as $\gamma$, a value between zero (i.e., very poor distribution) and one (i.e., perfect distribution) for each state. In general, the closer $\gamma$ is to one, the better the uniformity quality, and hence the better the catalytic performance. In most practical applications, emission control engineers target achieving $\gamma$ in the range of about 0.9-1, although other values may be desirable depending on system requirements and performance metrics. In the expression, $w_i$ is the 'local' (pointwise) value of reductant concentration at various points in a cross-section, while $\overline{w}$ is the average reductant concentration (averaged over the full cross-section); n is the number of measurement points taken. Ultimately, values of all UIs for various states are used to produce a predictive map as in FIG. 4A, leading to mixer power calculation map 50 of FIG. 3 which is embedded in controller 48 to enable UI predictive capability under various system performance conditions. Thus, it should be clarified that $UI_{L1}$ and $UI_{L2}$ of FIG. 3 are predictive UIs (not measured UIs) for given locations in the flow stream. Obviously, mixer power calculation map 50 takes parameters other than UI states into account.

Clearly, not all possible combinations of parameters in the matrix of Table 1 need to be produced a priori; instead, it is feasible to determine UI for only certain select parametric combinations (e.g., the outermost and innermost boundaries of the matrix and some UIs in between). UI values for other combinations can be determined using interpolation or extrapolation—a common engineering approach in mapping system performance involving a parametric study as in Table 1.

There are many situations in which reductant UI may be poor, focusing herein primarily on uniformity at the NOx reduction catalyst entrance. Low reductant uniformity can be caused by a combination of one or more parameters. A key driver may be poor uniformity of the base exhaust flow itself, for instance, due to improper configuration of exhaust hardware such as too many bends, sudden expansions in the flow path (most notorious ones are inlet cones to catalysts also known as inlet diffusers), or abrupt pressure changes in flow paths.

Another hardware-based cause of low reductant uniformity may be due to poor configuration of the UWS mixer, failing to produce desirable UWS droplet distribution in the exhaust conduit. A long mixing length (i.e., decomposition pipe length 18 of FIG. 1—the distance between the reductant injection point and catalyst entrance downstream of injection point) typically helps produce more favorable uniformity. In contrast, shorter mixing lengths can also produce poor uniformity, depriving the droplets from having sufficient residence time in the flow stream to heat, evaporate, and produce gaseous reductants through the well-known thermolysis and hydrolysis reactions (see below Literature citation 'Nova').

Other causes may be due to the reductant itself. For instance, in a typical exhaust flow condition (about 10-30 m/s speed in the exhaust pipe), larger UWS droplets (typically larger than about 50 microns) tend to have strong inertia and follow their own trajectories, while smaller droplets tend to be deflected by the exhaust flow, yielding suitable uniformity when the base flow itself has good uniformity, or yield poor uniformity in a poorly-distributed flow stream.

Larger droplets are more resistant to forming a uniform distribution since they tend to be driven by their own inertia, evaporate slower, remain heavier, or further risk coming into contact with the exhaust pipe (i.e., walls cooled by the ambient temperature environment), resulting in the formation of urea crystals. Finally, low exhaust temperatures typically exacerbate reductant uniformity since low temperatures retard droplet heating and evaporation. Assuming base flow has relatively reasonable uniformity, gaseous reductant species mixing with the flow are more likely to produce a desirable uniformity than unevaporated reductant droplets.

Controller 48 of FIG. 3 has no control over several parameters such as fixed (i.e., unchangeable) hardware (e.g., pipe diameter/length, mixing length, UWS injection position, and droplet size); likewise, when configured, controller 48 may have limited or no control over engine parameters such as exhaust flow rate and temperature. However, controller 48 does have control over $T_{mix}$ to raise and lower the temperature, UWS injection frequency and duty cycle (by communicating with injector DCU requiring desired UWS injection mass flow rate, frequency, and duty cycle), and EGR (by requiring the EGR to increase or decrease engine-out NOx, thereby influencing UWS injection mass flow rate, as well as other parameters). Chief among such parameters is $T_{mix}$ since its higher temperatures help rapidly evaporate droplets impinging on mixer 44 into gaseous species, facilitating improved reductant formation, mixing, and transport with the base flow, and hence improved uniformity and reductant concentration.

Generally, various combinations of the following are the main contributors to lowering reductant distribution quality, and hence lead to reduced reductant UI at the entrance to SCR catalyst 46. The primary contributors include inefficient mixer configuration, inadequate injection angle of droplets onto mixer 44 (i.e., undesirable droplet-mixer impingement configuration), shorter mixing length (decomposition pipe length), the prevalence of larger droplets, and lower exhaust temperature.

In contrast, to achieve a high UI, any of the following could improve distribution uniformity. Such aspects include: (1) robust mixer configuration, (2) suitable injection angle of droplets onto mixer 44 (i.e., desirable droplet-mixer impingement configuration), (3) longer mixing length (i.e., longer residence times for droplets), (4) smaller droplet sizes, and (5) higher temperature exposure for droplets. Among these, typically the first four are fixed due to hardware configuration or system specifications (e.g., given a UWS injector type); only the latter provides an opportunity for the mixer controller to raise droplet temperature via droplets impinging on the mixer heated by the controller, or via mixer heating the exhaust gas, which in turn heats the droplets).

Therefore, collectively the main capabilities of controller 48 of FIG. 3 can be summarized as follows.

1. Controller 48 can heat mixer 44 to desired temperatures in order to produce preferred amounts of reductants in order to achieve certain NOx reduction efficiency. This is particularly important at low-temperature exhaust conditions in which sufficient levels of gaseous reductants cannot be formed and urea crystallization risk is higher. In contrast, in the presence of a heated mixer, the injected droplets readily heat up when impinging upon the mixer, accelerating their rate of evaporation and phase change, and hence hastens gaseous reductant formation, valuable to the catalyst performance. This also reduces risks of undesirable urea crystal formation.

2. Employing suitable techniques (e.g., experimental setups or simulations) to compose a parametric matrix (as in Table 1) of various UI states a priori, the UI-states matrix is readily integrated into a predictive map (as in FIG. 4A) in controller 48. For instance, the matrix can be used to create an algorithm, embedded into the controller's onboard logic, integrated into one or more maps in controller 48, or a combination thereof, enabling controller 48 to evaluate or predict when reductant UI is undesirably low. Poor UI often indicates low catalytic efficiency.

3. The capabilities of controller 48 are especially significant at low operating temperatures. In contrast to capability 1 above, mere heating of mixer 44 (to accelerate droplet evaporation) may prove insufficient. By resorting to the embedded UI map of mixer power calculation map 50 (as in FIG. 4A), controller 48 can detect whether poor uniformity could be the cause of low catalytic efficiency.

Figure 4B:
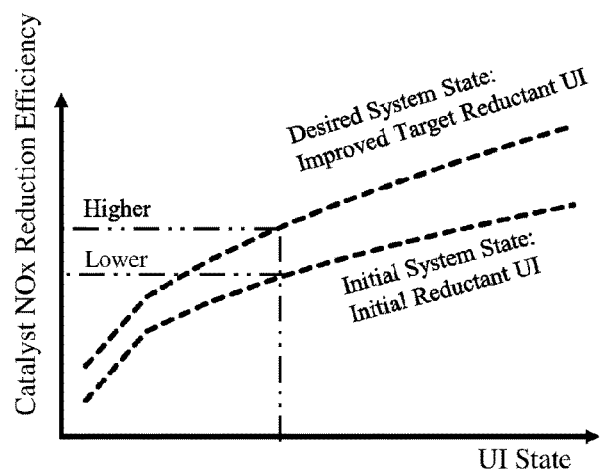
FIG. 4B depicts a graph of a modified version of FIG. 4A for an improved target reductant UI as a desired system state, according to embodiments of the present invention.

The point made in capability 3 above can be understood as follows. FIG. 4B depicts a graph of a modified version of FIG. 4A for an improved target reductant UI as a desired system state, according to embodiments of the present invention. When controller 48 of FIG. 3 receives signals indicating poor reductant uniformity (often accompanied by low catalytic efficiency, and in agreement with the embedded matrix as in FIG. 4A), controller 48 attempts to achieve a higher uniformity, a "desired system state" as in FIG. 4B in order to enhance NOx reduction efficiency.

It is noted and understood that the onboard logic embedded in controller 48 described herein may include its own integrated componentry (i.e., hardware, firmware, and/or software) for performing its prescribed functions. Thus, structural componentry such as processors, memory modules, instruction sets, and communication hardware and protocols are implicitly included in the description of controller 48.

Controller 48 targets such an improved UI state by accessing its embedded UI map and modifying parameters of influence, as shown in Table 2 by adjusting such parameters as $T_{mix}$, reductant injection rate, frequency, duty cycle, and/or even signaling the EGR for engine-out NOx coordination. Controller 48 can use its UI predictive capabilities to coordinate and improve NOx reduction system performance above and beyond simply heating mixer 44. The process transition from the initial system state to the desired system state by initially detecting a UI deficiency is shown in FIG. 4B and Table 2.

ously check, self-correct, and/or update its own predictive map and algorithm. For instance, under favorable conditions such as at higher exhaust temperatures, controller 48 can continually check its predictions against system performance signals (such as through $S_{NOx}$) to cross-check and update its own table versus system performance signals. Such self-correcting measures can be used to update the

TABLE 2

Predictive capability of the mixer controller for exemplary operating conditions for an undesirable, poor reductant distribution quality (i.e., a low UI as the Initial System State).

| | Engine Parameters Exhaust Gas | Mixer Parameters | UWS Injection Parameters (examples) | | | |
|---|---|---|---|---|---|---|
| | Recirculation (EGR) | Mixer Temperature | Injection Frequency | Injection Duty Cycle | Injection Mass Flow | UI State |
| Initial System State | High (~40-60%) | Low (~100-120) | Low (~0.5 Hz) | High (~40%) | Low | UI state determined by controller |
| Desired System State | Low (~0-20%) | High (~200-300) | Higher (~2-4 Hz) | Low (~20%) | High | UI state desired |
| Parameter Control Changes | Reduce EGR | Increase mixer temperature | Increase injection frequency | Lower injection duty cycle | Increase injection mass flow | UI state achieved |

The predictive capability shown in Table 2 is enabled by utilizing information from the parametric matrix (i.e., UI states) of Table 1, which is embedded within controller 48 of FIG. 3 as a predictive map. Controller 48 uses the embedded predictive map to discern which new combination of parameters will enhance reductant uniformity, and signals changes in such parameters, shown as "Parameter Control Changes" in Table 2 with exemplary parametric data.

Capabilities 1, 2, and 3 above are especially significant in low temperature exhaust operations, posing the risk of forming urea crystals (i.e., solid deposits) that can damage exhaust components, as well as causing a marked decrease in NOx control efficiency, among other detriments.

Given such capabilities of controller 48, in situations in which controller 48 predicts a poor UI, and its prediction is further confirmed via detection of a low catalytic efficiency in the system (such as through $S_{NOx}$), controller 48 responds by adjusting its outputs accordingly.

Consider for instance an operating condition resulting from a certain combination of exhaust flow rate, flow temperature, NOx emission rate, UWS injection rate, and EGR value in combination with other parameters in which, according to FIG. 4A, controller 48 readily predicts a low, undesirable uniformity will form, hinting at lowered NOx reduction catalytic efficiency, with such a prediction being confirmed via system signals fed into controller 48, as described above with regard to FIG. 3.

Facing such undesirable UI and catalytic inefficiency, controller 48 may send corrective signals to certain system components inter alia including any combination of: increasing $T_{mix}$ (by triggering an increase in energy delivered to mixer 44); issuing signals to change the UWS injection rate, frequency, and/or duty cycle; and/or issuing signals to the EGR to change the EGR value, among other signals. Examples of corrective measures and signal issuance to various components by controller 48 are shown in Table 2.

There are circumstances in which controller 48 may choose not to take corrective measures, for instance, when system performance and especially NOx reduction efficiency is desirable and meeting performance targets.

With controller 48 equipped with its predictive map (as in FIG. 4A), controller 48 has sufficient flexibility to continutable of controller 48 versus drifts in signals such as due to catalyst aging, system degradation, or injector aging. Such a so-called adaptation strategy can help with controller functions and system longevity. An exemplary adaptation strategy could be to increase baseline wattage input to mixer 44 in order to increase $T_{mix}$. An outcome of such a strategy is to increase ammonia concentration (via signaling to an injector DCU to increase injection) —if SCR catalyst efficiency goes up, it indicates there is room for improvement.

Another aspect in which controller 48 can enhance system performance is with SCR catalyst performance, which depends on injected urea mass coming into mixer 44. Urea concentration depends on $T_{mix}$—a hotter mixer leads to more ammonia being formed. Therefore, if and when SCR catalyst performance is poor, one can increase $T_{mix}$. If SCR catalyst performance improves, it indicates that ammonia concentration and/or uniformity has increased, improving SCR catalyst performance.

Another aspect in which controller 48 can enhance system performance is to remove urea crystal deposits. When an engine is initially started, before it reaches higher temperatures (e.g., during the first few minutes of operation), mixer 44 can be heated, without any or before any urea injection, in order to burn off any residual deposits retained from previous drive cycle. If $S_{NOx}$ (downstream of SCR catalyst 46) signals an unusual increase ($S_{NOx}$ can respond to both NOx and ammonia), it indicates that urea crystals deposits are/were present in the exhaust pipe, and are being removed by the additional help in heating the exhaust gas using heated mixer 44.

Another aspect in which controller 48 can enhance system performance is to prime mixer 44 with a relatively small amount of injected urea such as during an engine cold-start before the mixer is heated (by supplied power, by exhaust gas flow, or a combination of the two). When mixer 44 subsequently heats up, the urea-primed mixer provides ammonia to SCR catalyst 46 for ammonia storage.

Another aspect in which controller 48 can enhance system performance or perform diagnostics is to use higher pressure signals in the exhaust gas due to the presence of urea crystals plugging the exhaust system or components within. Controller 48 can increase $T_{mix}$ by supplying wattage to mixer 44 without injecting urea. If $S_{NO_x}$ (downstream of SCR catalyst 46) signals an increase in ammonia, it indicates the presence of solid urea and its sublimation. Thus, deposits in the exhaust pipe could be burned off by heating mixer 44, which in turn heats the exhaust gas. Another possible source for such crystal deposits is as residue in the exhaust pipe from a previous run before the engine was turned off.

Another aspect in which controller 48 can enhance system performance is to use the UI predictive map to influence UI in systems in which a heated mixer is absent. For instance, UI can be influenced by changing UWS injection frequency and duty cycle, or signaling change to the EGR.

Figure 5:
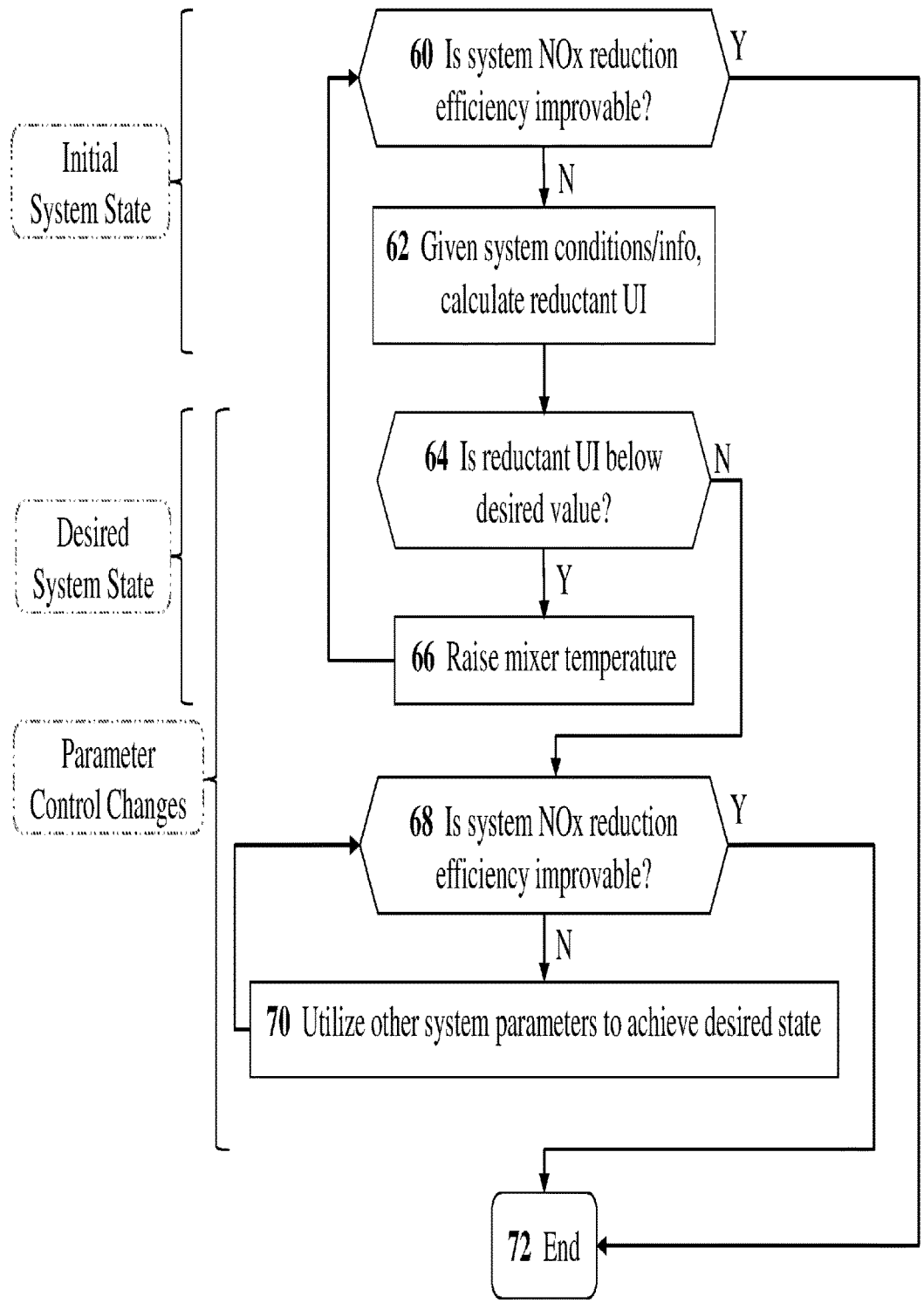
FIG. 5 is a simplified flowchart of the major process steps for an initial system state to a desired system state having a target reductant UI using parameter control changes, according to embodiments of the present invention.

FIG. 5 is a simplified flowchart of the major process steps for an initial system state to a desired system state having a target reductant UI using parameter control changes, according to embodiments of the present invention. The process starts with the controller determining whether system NOx reduction efficiency is improvable (Step 60). If so, then the process ends (Step 72). If not, then the controller calculates the reductant UI given system conditions/information (Step 62). Steps 60 and 62 define the initial system state.

The controller then determines whether the reductant UI is below the desired value (Step 64). If so, then the controller raises the mixer temperature (Step 66), and returns to Step 60. Steps 64 and 66 define the desired system state.

If not, then the controller again determines whether system NOx reduction efficiency is improvable (Step 68). If so, then the process ends (Step 72). If not, then the controller utilizes other system parameters to achieve desired state (e.g., signaling to a DCU to modify reductant injection (mass, frequency, duty cycle), and/or to EGR) (Step 70). Steps 64, 66, 68, and 70 define the parameter control changes having taken place in transitioning from initial system state to desired system state.

While the present invention has been described with respect to a limited number of embodiments, it will be appreciated that many variations, modifications, equivalent structural elements, combinations, sub-combinations, and other applications of the present invention may be made.

LITERATURE

Analytics. "Why cold starts could freeze air pollution improvements," Cold-start engine research conducted by Emissions Analytics Inc. available at: http://emissionsanalytics.com/why-cold-starts-could-freeze-air-pollution-improvements/#_ftn2 (Feb. 15, 2015).

ICCT-1. Muncrief, R., "NOx emissions from heavy-duty and light-duty diesel vehicles in the EU: Comparison of real-world performance and current type-approval requirements," www.theICCT.org (2017).

Science. Sowman, D. Laila, Cruden, A., and Fussy, P., "Nonlinear Model Predictive Control for Cold Start Selective Catalytic Reduction," Science Direct, Papers Online, 48, 23, 471-476 (2015).

SEI. Stockholm Environmental Institute, https://www.sei-international.org/gapforum/policy/effectshuman-health.php (Feb. 18, 2018).

Nova. Nova, I. and Tronconi, E., "Urea-SCR Technology for deNOx Aftertreatment of Diesel Exhausts," ISBN 978-1-4899-8071-7, Book, Springer Publishing (2014).

Weltens. Weltens, H., Bressler, H., Terres, F., Neumaier, H. and Rammoser, D., "Optimization of Catalytic Converter Gas Flow Distribution by CFD. SAE Predictions," 930780 (1993).

Munnannur. Munnannur, A., Cremeens, C., and Liu, Z., "Development of Flow Uniformity Indices for Performance Evaluation of Aftertreatment Systems," SAE Int. J. Engines 4(1):1545-1555 (2011).

CLEERS-2018-1. Conference presentation, Pauly, T., Umicore Autocat USA Inc., slide #8: https://cleers.org/wp-ontent/uploads/formidable/3/2018CLEERS_ThomasPauly_Web-1.pdf.

CLEERS-2018-2. Conference presentation, Prikhodko, V., slide #4: https://cleers.org/wp-content/uploads/formidable/3/2018CLEERS_VitalyPrikhodko_Web.pdf.

What is claimed is:

1. A method for controlling a heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the heated mixer, the method comprising the steps of:
   a) determining a NOx reduction efficiency of the SCR catalyst;
   b) evaluating at least one reductant Uniformity Index (UI) based on operating parameters of the exhaust system and a mixer power calculation map; and
   c) modifying a mixer temperature of the heated mixer by regulating power to the heated mixer based on said at least one reductant UI in order to improve said at least one reductant UI and/or improve said NOx reduction efficiency.

2. The method of claim 1, wherein said operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer temperature, a stored ammonia mass in the SCR catalyst, a stored NOx mass in the SCR catalyst, a stored sulfur mass in the SCR catalyst, a stored hydrocarbon mass in the SCR catalyst, an Exhaust Gas Recirculation (EGR) percentile setting, an engine load, and an engine speed.

3. The method of claim 1, wherein a plurality of said reductant UIs forms a basis for at least one UI state, and wherein said at least one UI state is indicative of a relative NOx reduction efficiency.

4. The method of claim 1, wherein said at least one reductant UI is evaluated for at least one specific location in said exhaust system, and wherein said at least one specific location includes a catalyst location upstream of the SCR catalyst and/or a mixer location upstream of the heated mixer.

5. The method of claim 1, wherein said step of modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

6. The method of claim 1, the method further comprising the step of:
   d) validating said at least one reductant UI and/or said mixer power calculation map based on said operating parameters of the exhaust system.

7. The method of claim 1, the method further comprising the step of:
   d) detecting at least one potential improvement of said at least one UI and/or said NOx reduction efficiency based on an increased ammonia mass in the exhaust system.

8. The method of claim 1, the method further comprising the step of: d) prior to said step of determining, removing urea crystal deposits by regulating power to the heated mixer prior to any UWS injection in the exhaust system.

9. The method of claim 1, the method further comprising the step of:
   d) prior to said step of determining, priming the heated mixer by instructing the UWS injector to inject UWS onto the heated mixer.

10. The method of claim 1, the method further comprising the steps of:
   d) prior to said step of determining, increasing power to the heated mixer prior to any UWS injection in the exhaust system;
   e) prior to said step of determining, measuring an increased ammonia mass in the exhaust system; and
   f) prior to said step of determining, identifying a urea crystal blockage of said exhaust system based on:
      i) observing a higher exhaust gas pressure than under normal operating conditions of the exhaust system; and
      ii) said increased ammonia mass in the exhaust system.

11. A device for controlling a heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the heated mixer, the device comprising:
   a) a CPU for performing computational operations;
   b) a memory module for storing data;
   c) a controller module configured for:
      i) determining a NOx reduction efficiency of the SCR catalyst;
      ii) evaluating at least one reductant Uniformity Index (UI) based on operating parameters of the exhaust system and a mixer power calculation map; and
      iii) modifying a mixer temperature of the heated mixer by regulating power to the heated mixer based on said at least one reductant UI in order to improve said at least one reductant UI and/or improve said NOx reduction efficiency.

12. The device of claim 11, wherein said operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer temperature, a stored ammonia mass in the SCR catalyst, a stored NOx mass in the SCR catalyst, a stored sulfur mass in the SCR catalyst, a stored hydrocarbon mass in the SCR catalyst, an Exhaust Gas Recirculation (EGR) percentile setting, an engine load, and an engine speed.

13. The device of claim 11, wherein a plurality of said reductant UIs forms a basis for at least one UI state, and wherein said at least one UI state is indicative of a relative NOx reduction efficiency.

14. The device of claim 11, wherein said at least one reductant UI is evaluated for at least one specific location in said exhaust system, and wherein said at least one specific location includes a catalyst location upstream of the SCR catalyst and/or a mixer location upstream of the heated mixer.

15. The device of claim 11, wherein said modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

16. The device of claim 11, the controller module further configured for:
   iv) validating said at least one reductant UI and/or said mixer power calculation map based on said operating parameters of the exhaust system.

17. The device of claim 11, the controller module further configured for:
   iv) detecting at least one potential improvement of said at least one UI and/or said NOx reduction efficiency based on an increased ammonia mass in the exhaust system.

18. The device of claim 11, the controller module further configured for:
   iv) prior to said determining, removing urea crystal deposits by regulating power to the heated mixer prior to any UWS injection in the exhaust system.

19. The device of claim 11, the controller module further configured for: iv) prior to said determining, priming the heated mixer by instructing the UWS injector to inject UWS onto the heated mixer.

20. The device of claim 11, the controller module further configured for:
   iv) prior to said determining, increasing power to the heated mixer prior to any UWS injection in the exhaust system;
   v) prior to said determining, measuring an increased ammonia mass in the exhaust system; and
   vi) prior to said determining, identifying a urea crystal blockage of said exhaust system based on:
      A) observing a higher exhaust gas pressure than under normal operating conditions of the exhaust system; and
      B) said increased ammonia mass in the exhaust system.

* * * * *